Dec. 16, 1924.
A. URQUHART
CLUTCH
Filed May 29, 1923
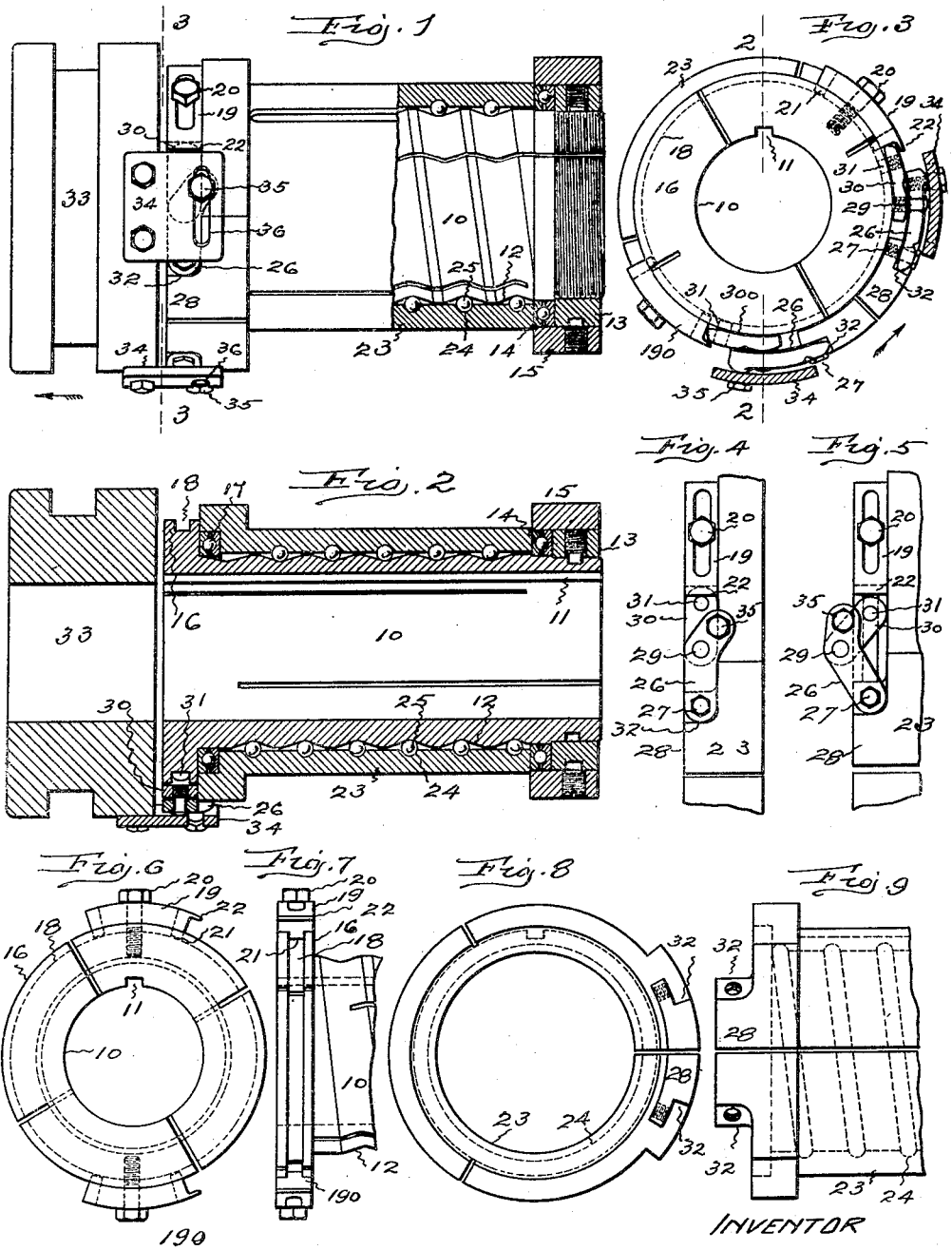
INVENTOR
Alexander Urquhart
by Harry R. Williams
atty.

Patented Dec. 16, 1924.

1,519,386

UNITED STATES PATENT OFFICE.

ALEXANDER URQUHART, OF DERBY, CONNECTICUT.

CLUTCH.

Application filed May 29, 1923. Serial No. 642,162.

*To all whom it may concern:*

Be it known that I, ALEXANDER URQU-HART, a citizen of the United States, residing at Derby, in the county of New Haven and State of Connecticut, have invented a new and useful Improvement in Clutches, of which the following is a specification.

This invention relates to friction clutches of the type having members which may be set up for clutching a driving pulley or gear to a driven shaft or arbor, or piece of work, or for clutching a driving shaft or arbor to a driven pulley or gear as conditions present themselves, of the character shown and described in Patent #1,464,551 granted to me August 14, 1923, and in my application #635.321, filed April 28, 1923.

The object of the invention is to provide a simple, easily operated clutch of this class which has a very powerful clutching action caused in such manner that the rotation of the driving member and the resistance of the driven member automatically tend to tighten the grip, the parts being so designed that the clutch can be readily adjusted to accommodate itself to the rotation of the driving member in either direction, and can be arranged to grip and release either the driving member or grip and release the driven member, as desired.

This object can be attained in an apparatus such as illustrated as embodying the invention, by arranging a contractile sleeve within an expansible sleeve, with means intermediate the sleeves that, when one sleeve is rotated relatively to the other, tends to expand the outer sleeve or contract the inner sleeve, shipping means being provided for positioning the parts so as to cause this relative rotation of one sleeve to the other. With such a construction if the inner sleeve is keyed to a shaft or arbor and cannot contract, the outer sleeve will be expanded, as in the hub of a gear or pulley, while should the outer sleeve be keyed in the hub of a gear or pulley the inner sleeve will be contracted upon a shaft or arbor or piece of work by the proper movement of the shipping means.

In the accompanying drawings Figure 1 shows a side elevation, with parts in section, of a clutch that embodies the invention. Fig. 2 shows a longitudinal section of the same on the plane indicated by the dotted line 2—2 on Fig. 3. Fig. 3 shows a transverse section on the plane indicated by the dotted line 3—3 on Fig. 1. Fig. 4 shows the operating toggle levers closed. Fig. 5 shows the operating toggle levers opened. Fig. 6 is an end view of the inner sleeve. Fig. 7 is a side view of the end of the inner sleeve. Fig. 8 is an end view of the outer sleeve. Fig. 9 is a side view of the end of the outer sleeve.

The inner sleeve 10 has an interior diameter of a size to fit or approximately fit the shaft or arbor with which it is to be used or piece of work it is to hold, and it has a key-way 11 by means of which it may be keyed or splined to a shaft or arbor. About the exterior of the inner sleeve is a spiral groove 12 the bottom of which is conical. This groove may be right or left handed and there may be one or more of the grooves as desired. Held at one end of the sleeve is a collar 13 which may be solid, slitted or segmental, as desired. Bearing against this collar is a thrust bearing 14 and over the collar 13 and the bearing 14 is a collar 15. At the other end is a flange 16 bearing against which is thrust bearing 17. In the flange is a circumferential groove 18. Attached to the flanged end of the inner sleeve there may be one or more blocks 19, preferably two as illustrated. These blocks are located approximately diametrically opposite each other and are adjustable about the periphery of the flange, being held in position by screws 20 that pass through slots in the blocks which desirably have tongues 21 that fit the slot in the periphery of the flange so that the blocks will not turn. At one end these blocks may have overhanging lips 22. The inner sleeve may be slitted longitudinally, as illustrated, so that it may expand and contract if it is to be employed to clutch a shaft or arbor or piece of work.

The outer sleeve 23 is rotatably fitted upon the inner sleeve between the thrust bearings. In the interior of the outer sleeve are one or more spiral grooves 24, preferably one, that complement the spiral groove or grooves about the exterior of the inner sleeve. If the groove in the inner sleeve has a conical bottom the groove in the outer sleeve is preferably semi-circular in cross section. The outer sleeve is slitted so that it may expand and contract, and between the sleeves are placed expanding or contracting means, preferably balls 25 that fit the semi-circular groove. The grooves complement each other, that is, they have the same or substantially the same pitch and the balls fill the grooves practically one-half lying in each part. When one sleeve is rotated with relation to the other from neutral position, in either direction, the balls are carried outward on the inclined bottom of the groove in the inner sleeve and tend to expand the outer sleeve or contract the inner sleeve according to the conditions of use. If the inner sleeve is solid on a shaft or arbor and the outer sleeve is loose in the hub of a gear or pulley, the outer sleeve will be expanded. On the contrary if the outer sleeve is tight in the hub of a gear or pulley and the inner sleeve is loose on a shaft or arbor or piece of work, the inner sleeve will be contracted, by the relative rotation of the sleeves from normal position. A clutch having this construction may be installed so that a pulley or gear, whether driving or driven, may be clutched to a shaft or arbor, whether driven or driving, by the expansion of the outer sleeve, or a shaft or arbor, whether driving or driven, may be clutched to a pulley or gear, whether driven or driving, by the contraction of the inner sleeve, according to desire or convenience. These actions may be accomplished regardless of the direction of rotation of the driving member, except that it is preferred that the relative rotation of the outer sleeve to cause the clutching action be in the same direction as the driving member is rotated in order that the power of the driving member may be utilized to increase the clutching action. By having the bottom of one groove conical as illustrated this is possible, for if one sleeve is turned with relation to the other in one direction the balls are carried up one incline, and if the relative rotation is in the opposite direction the balls are carried up the other incline of the bottom of the groove.

In the preferred arrangement in order to effect the relative rotation of the sleeves a lever 26 is pivoted by a stud 27 to an extension 28 from the flanged end of the outer sleeve, and pivoted to this lever by stud 29 is a lever 30 which latter lever has a stud 31 that extends loosely into the groove about the flanged end of the inner sleeve. The pivoted end of the lever 26 bears against the shoulder 32 on the outer sleeve, and the free end of the lever 30 is adapted to be forced against or withdrawn from one of the blocks 19, that are adjustably fastened to the flanged end of the inner sleeve, by the straightening or collapsing of this toggle. A shipping sleeve 33 provided with a bore that will loosely fit the shaft or arbor upon which the clutch is to be mounted, is located adjacent to the ends of the clutching sleeves which carry these levers. This shipping sleeve is adapted to be engaged by any common form of shipping lever which, without interfering with its rotation, will move the sleeve toward or from the clutching members. Attached to the shipping sleeve is a plate 34 which is connected with the toggle lever 26 by a stud 35 that passes loosely through a slot 36 in the plate and into the levers. It is preferred as illustrated to provide two toggles, each of which has a lever connected with the outer sleeve, and a lever connected with the inner sleeve. These toggles are similar and are connected in the same way with the shipping sleeve but they are arranged oppositely, that is, in such manner that when the toggles are straightened the levers pivoted to the outer sleeve are forced toward each other and tend to cause the contraction of the outer sleeve, while the levers connected with the inner sleeve tend to press against the adjustable blocks and force them rotatably toward each other. When the toggle is collapsed the outer sleeve is free to expand.

Assuming that the inner sleeve is keyed to a shaft which is to be driven in the direction indicated by the arrow on Fig. 3 by a driving pulley that is loosely mounted on the outer sleeve, to cause the pulley to be clutched under these conditions the shipping sleeve is moved in the direction indicated by the arrow on Fig. 1. This movement of the sleeve will collapse the toggles and permit the outer sleeve to expand. As the outer sleeve expands into the hub of the pulley, which is the driving member in the case assumed, friction tends to rotate the outer sleeve with relation to the inner sleeve which is fast to the shaft to be driven, in the direction of rotation of the pulley, in such a manner that the balls will be carried up one of the inclines of the bottom of the groove in the inner sleeve and tend to further expand the outer sleeve and cause it to tighten its grip against the bore in the hub of the driving pulley. When it is desired to release the clutch under these conditions the shipping sleeve is moved in the opposite direction from that described or toward the clutching members. This will cause the toggle to straighten. When the toggle is straightened one lever will tend to turn the outer sleeve in a direction opposite to the rotation of the driving member and the other lever will tend to turn the inner sleeve in the same direction as the rotation of the driving member, and thus cause the balls to be carried down the incline in the groove to neutral position. The blocks on the inner sleeve are so adjusted that when this action has been completed, continued movement of the shipping sleeve will cause the levers attached to the outer sleeve to contract that sleeve and hold the balls in neutral position. This action is permitted by reason of the adjustment of the blocks on the inner sleeve. If the clutch is rotating in one direction, for instance in the direction indicated by the arrow on Fig. 3, the adjustment of the block is such that the lever 30 will engage the block 19 before the lever 300 engages the block 190 and first turn the inner sleeve relatively to the outer sleeve and then the toggles will work oppositely and contract the outer sleeve. If the driving member is rotating in the opposite direction the blocks are adjusted reversely, that is, so the lever 300 will engage the block 190 before the lever 30 engages the block 19.

As pointed out, if the inner sleeve is slitted and is loose on a shaft or arbor or is to be contracted on a piece of work, and the outer sleeve is keyed in the bore of a gear or pulley, the inner sleeve may be contracted so as to make the clutch, for if the outer sleeve cannot expand the inner sleeve must contract, if contractible. In other words the appliance may be installed to effect the clutching by the contraction of the inner sleeve, or by the expansion of the outer sleeve, according to the desired use, and the clutching may be interior or exterior regardless of the direction of rotation of the driving means. If the driving member is rotating in one direction the balls are moved up on the incline on one side of the groove and if the driving member is rotating in the opposite direction the balls are moved up on the other side of the groove, for causing the clutching action, and moved back to the bottom of the groove to release the parts.

If only one toggle is used, the stud 31 in the lever 30 may be set into the flange of the inner sleeve, and then straightening the toggle will cause such a relative rotation of the sleeves as will move the balls from neutral position and cause the outer sleeve to expand, or the inner sleeve to contract; and collapsing the toggle will cause such relative rotation of the sleeves that the balls will be returned to neutral position and allow the outer sleeve to contract or the inner sleeve to expand.

The device is thus capable of being installed for use as an exterior or interior clutch, or as a chuck, with the driving member rotated in either direction. Either or both sleeves may be made expansible or contractible; one or two toggles may be employed between the shipping sleeve and the clutching members, and they may be connected to allow the expansion or contraction, or may cause the expansion or contraction of the sleeves; the intermediate expanding or contracting means may be balls or similar pieces; and the grooves may be multiple or single, or may be reversed from those shown, without departing from the invention.

The invention claimed is:—

1. A clutch comprising an inner sleeve provided on its exterior with a spiral groove, an outer sleeve provided in its interior with a spiral groove, said sleeves being associated so that one may be rotated but not moved lengthwise with relation to the other, means occupying said grooves and adapted by the rotation of one sleeve with relation to the other, to exert radial pressure between the sleeves, a toggle with one lever engaged with the inner sleeve and one lever connected with the outer sleeve for causing the relative rotation of the sleeves, and means connected with and adapted to straighten and collapse said toggle.

2. A clutch comprising an inner sleeve provided on its exterior with a spiral groove, an outer sleeve provided in its interior with a spiral groove, one of said grooves having a conical bottom and the other a semi-circular cross section, said sleeves being associated so that one may be rotated, but not moved lengthwise, with relation to the other, means occupying said grooves and adapted, by the rotation of one sleeve with relation to the other, to exert radial pressure between the sleeves, a toggle with one lever engaged with the inner sleeve and one lever connected with the outer sleeve, for causing the relative rotation of the sleeves, and means connected with and adapted to straighten and collapse said toggle.

3. A clutch comprising an inner sleeve provided on its exterior with a spiral groove having a conical bottom, an outer sleeve provided in its interior with a spiral groove of semi-circular cross section, said sleeves being associated so that one may be rotated but not moved lengthwise with relation to the other, means occupying said grooves and adapted, by the rotation of one sleeve with relation to the other, to exert radial pressure between the sleeves, a toggle with one lever engaged with the inner sleeve and one lever connected with the outer sleeve for causing the relative rotation of the sleeves, and means connected with and adapted to straighten and collapse said toggle.

4. A clutch comprising an inner sleeve provided on its exterior with a spiral groove, having a conical bottom, an outer expansible sleeve provided in its interior with a spiral groove of semi-circular cross section, said sleeves being associated so that one may be rotated but not moved lengthwise with relation to the other, means occupying said grooves and adapted, by the rotation of one sleeve with relation to the other, to exert radial pressure between the sleeves, a toggle with one lever engaged with the inner sleeve and one lever connected with the outer sleeve for causing the relative rotation of the sleeves, and means connected with and adapted to straighten and collapse said toggle.

5. A clutch comprising an inner sleeve provided on its exterior with a spiral groove, an outer sleeve provided in its interior with a spiral groove, one of said grooves having a conical bottom and the other a semi-circular cross section, said sleeves being associated so that one may be rotated, but not moved lengthwise, with relation to the other, means occupying said grooves and adapted, by the rotation of one sleeve with relation to the other, to exert radial pressure between the sleeves, toggles with one lever engaged with the inner sleeve and one lever connected with the outer sleeve, for causing the relative rotation of the sleeves, said toggles being arranged to act oppositely on said sleeves, and means connected with and adapted to straighten and collapse said toggles.

6. A clutch comprising an inner sleeve provided on its exterior with a spiral groove, an outer sleeve provided in its interior with a spiral groove, one of said grooves having a conical bottom and the other a semi-circular cross section, said sleeves being associated so that one may be rotated, but not moved lengthwise, with relation to the other, means occupying said grooves and adapted, by the rotation of one sleeve with relation to the other, to exert radial pressure between the sleeves, toggles with one lever engaged with the inner sleeve and one lever connected with the outer sleeve, for causing the relative rotation of the sleeves, said toggles being arranged to act oppositely on said sleeves, blocks adjustably attached to one sleeve and adapted to be engaged by one lever of each toggle, and means connected with and adapted to straighten and collapse said toggles.

7. A clutch comprising an inner sleeve provided on its exterior with a spiral groove, an outer sleeve provided in its interior with a spiral groove, one of said grooves having a conical bottom and the other a semi-circular cross section, said sleeves being associated so that one may be rotated, but not moved lengthwise, with relation to the other, means occupying said grooves and adapted, by the rotation of one sleeve with relation to the other, to exert radial pressure between the sleeves, and means adapted to rotate one sleeve with relation to the other.

8. A clutch comprising an inner collapsible sleeve provided on its exterior with a spiral groove having a conical bottom, an outer expansible sleeve provided in its interior with a spiral groove of semi-circular cross section, said sleeve being associated so that one may be rotated but not moved lengthwise with relation to the other, balls occupying said grooves and adapted, by the rotation of one sleeve with relation to the other, to exert radial pressure between the sleeves, toggles with one lever engaged with the inner sleeve and one lever connected with the outer sleeve for causing the relative rotation of the sleeves, a shipping sleeve movable toward and from the inner and outer sleeves, and slotted plates attached to the shipping sleeve and connected with and adapted to straighten and collapse said toggles.

9. A clutch comprising an inner collapsible sleeve provided on its exterior with a spiral groove having a conical bottom, an outer expansible sleeve provided in its interior with a spiral groove of semi-circular cross section, said sleeves being associated so that one may be rotated but not moved lengthwise with relation to the other, balls occupying said grooves and adapted, by the rotation of one sleeve with relation to the other, to exert radial pressure between the sleeves, toggles with one lever engaged with the inner sleeve and one lever connected with the outer sleeve for causing the relative rotation of the sleeves, blocks adjustably attached to the inner sleeve and adapted to be engaged by one lever of each toggle, a shipping sleeve movable toward and from the inner and outer sleeves, and slotted plates attached to the shipping sleeve and connected with and adapted to straighten and collapse said toggles.

10. A clutch comprising an inner sleeve provided on its exterior with a spiral groove, an outer expansible sleeve provided in its interior with a spiral groove, one of said grooves having a conical bottom and the other a semi-circular cross section, said sleeves being associated so that one may be rotated, but not moved lengthwise, with relation to the other, means occupying said grooves and adapted, by the rotation of one sleeve with relation to the other, to exert radial pressure between the sleeve, toggles engaging the sleeves and adapted to cause the relative rotation of the sleeves, and contract the outer sleeve, and means connected with and adapted to straighten and collapse said toggles.

11. A clutch comprising an inner collapsible sleeve provided on its exterior with a spiral groove having a conical bottom, an outer expansible sleeve provided in its interior with a spiral groove of semi-circular cross section, said sleeves being associated so that one may be rotated with relation to the other, thrust bearings arranged to prevent the relative endwise movement of the sleeves, balls occupying said grooves and adapted, by the rotation of one sleeve with relation to the other, to exert radial pressure between the sleeves, toggles with one lever engaged with the inner sleeve and one lever connected with the outer sleeve for causing the relative rotation of the sleeves, blocks adjustably attached to the inner sleeve and adapted to be engaged by one lever of each toggle, a shipping sleeve movable toward and from the inner and outer sleeves, and slotted plates attached to the shipping sleeve and connected with and adapted to straighten and collapse said toggles.

12. A clutch comprising an inner sleeve, an outer sleeve, said sleeves being associated so that one may be rotated, but not moved lengthwise, with relation to the other, means intermediate the sleeves whereby the rotation of one sleeve with relation to the other in either direction causes said means to exert radial pressure between the sleeves and means for causing a relative rotation of the sleeves in either direction.

13. A clutch comprising an inner sleeve, an outer expansible sleeve, said sleeves being associated so that one may be rotated but not moved lengthwise with relation to the other, means intermediate the sleeves whereby the rotation of one sleeve with relation to the other in either direction from neutral position causes said means to expand the outer sleeve, and means for causing the relative rotation of the sleeves in either direction.

14. A clutch comprising an inner sleeve, an outer sleeve, said sleeves being associated so that one may be rotated, but not moved lengthwise, with relation to the other, grooves in the sleeves and balls in the grooves intermediate the sleeves whereby the rotation of one sleeve with relation to the other in either direction causes said balls to exert radial pressure between the sleeves, and means for causing a relative rotation of the sleeves in either direction.

15. A clutch comprising an inner sleeve, an outer yielding sleeve, said sleeves being associated so that one may be rotated but not moved lengthwise with relation to the other, means intermediate the sleeves whereby the rotation of one sleeve with relation to the other in either direction from neutral position causes said means to change the radial relation of one sleeve to the other, and means for causing the relative rotation of the sleeves in either direction.

ALEXANDER URQUHART.